No. 719,823. PATENTED FEB. 3, 1903.
A. C. LINDGREN.
COVERING DEVICE FOR SEEDING MACHINES.
APPLICATION FILED NOV. 19, 1902.
NO MODEL. 2 SHEETS—SHEET 1.
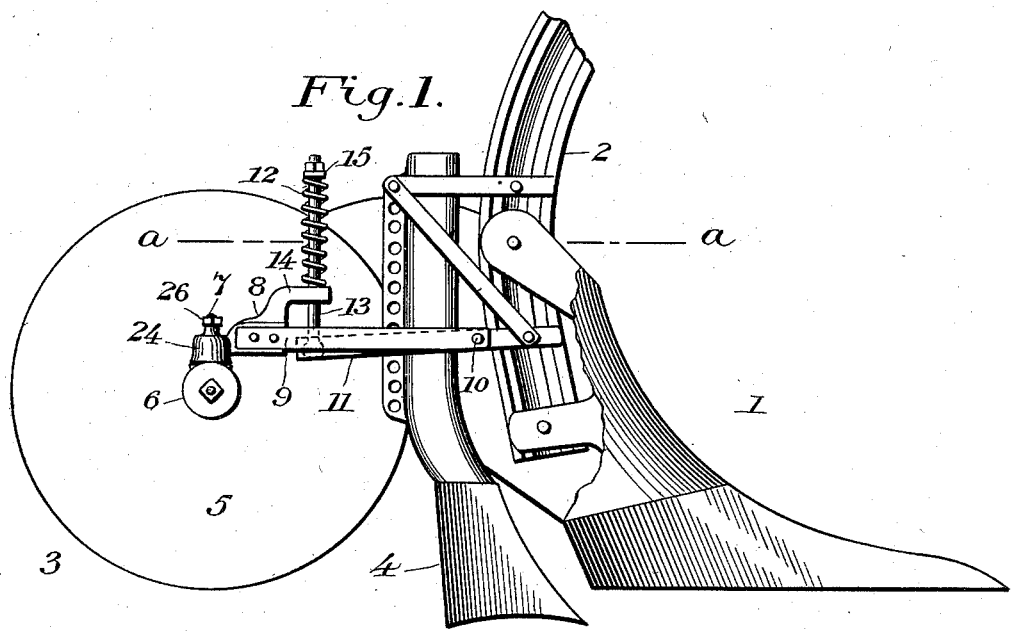
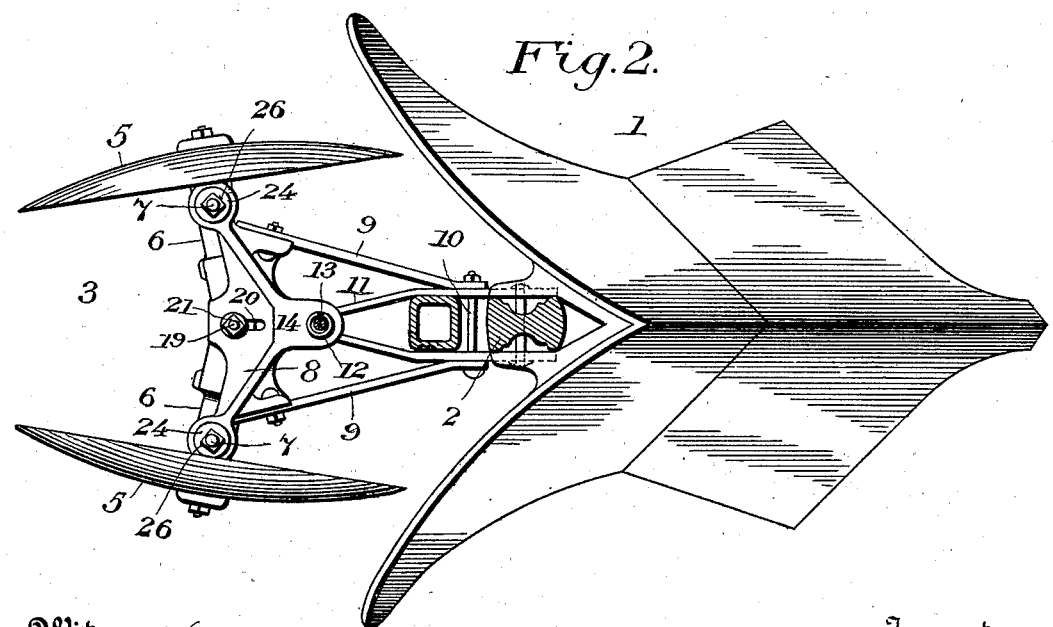
Witnesses
F. S. Elmore
W. R. Kennedy
Inventor
A. C. Lindgren
by Phil. T. Dodge
Attorney.

No. 719,823. PATENTED FEB. 3, 1903.
A. C. LINDGREN.
COVERING DEVICE FOR SEEDING MACHINES.
APPLICATION FILED NOV. 19, 1902.
NO MODEL. 2 SHEETS—SHEET 2.
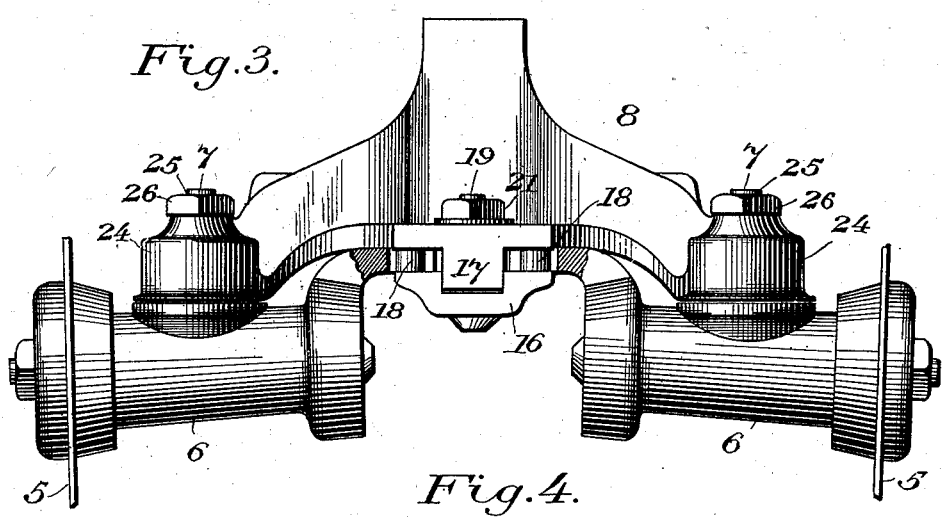
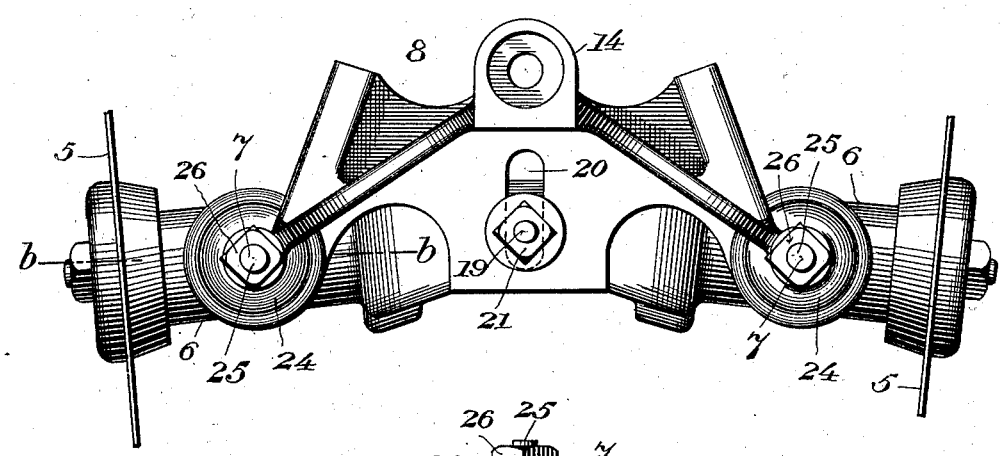
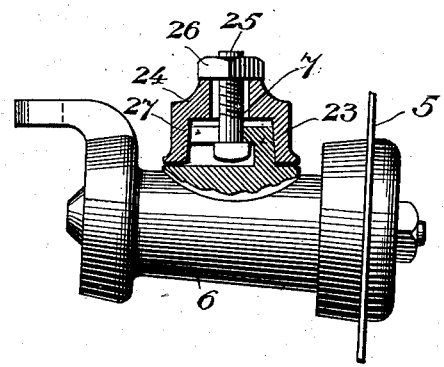

UNITED STATES PATENT OFFICE.

ALEXUS C. LINDGREN, OF MOLINE, ILLINOIS, ASSIGNOR TO THE MOLINE PLOW COMPANY, A CORPORATION OF ILLINOIS.

COVERING DEVICE FOR SEEDING-MACHINES.

SPECIFICATION forming part of Letters Patent No. 719,823, dated February 3, 1903.

Application filed November 19, 1902. Serial No. 131,966. (No model.)

*To all whom it may concern:*

Be it known that I, ALEXUS C. LINDGREN, of Moline, county of Rock Island, and State of Illinois, have invented a new and useful Improvement in Covering Devices for Seeding-Machines, of which the following is a specification.

This invention relates to seeding-machines of the type known as "listers," embodying usually a moldboard-plow to the beam of which is attached a suitable seed-dropping mechanism arranged to deposit the seed in the furrow formed by the plow.

The present invention is directed more particularly to a covering device for the deposited seed, which device travels, as usual, in the rear of the plow and acts to scrape and work in the soil on the seed in the furrow.

The invention consists of a covering device in the form of two disks sustained by and connected in an improved manner with the plow-beam, so as to have a yielding or floating action independently of the rocking motion of the plow, to the end that the disks will work at a uniform depth.

The invention consists also in improved means for adjusting the angle of the disks with reference to the line of travel of the machine so that they will act to throw more or less soil into the furrow, corresponding to the conditions encountered in the practical operation of the device.

The invention consists also in the details of construction and combination of parts hereinafter described and claimed.

In the accompanying drawings, Figure 1 is a side elevation of the rear end of a plow, showing my improved covering device applied thereto. Fig. 2 is a horizontal sectional plan looking downward on the line *a a* of Fig. 1. Fig. 3 is a rear elevation on an enlarged scale, partly in section, on the casting or frame of which the disks are mounted. Fig. 4 is a top plan view of the same on an enlarged scale. Fig. 5 is a vertical sectional elevation on the line *b b*, Fig. 4, showing how the disk-carriers are connected with the disk-frame.

Referring to the drawings, 1 represents a moldboard-plow; 2, the plow-beam; 3, a covering device arranged in rear of the beam, and 4 a subsoiler formed with a vertical shank situated between the plow and the covering device and provided with an opening or conduit into which the seed is discharged by a suitable seeding mechanism (not shown) and by which the seed is directed in the furrow formed by the plow.

The covering device is in the form of two vertical opposing disks 5, mounted on the outer ends of horizontal disk-carriers 6, journaled between their ends on vertical axes 7 on the outer projecting ends of a casting or frame 8 in such manner that by the adjustment of the carriers around the axes the inclination of the disks with respect to the line of travel of the machine may be varied, as will be more fully described hereinafter. The disk-frame 8 is fixed between the rear ends of two draft-bars 9, constituting a draft-frame which is jointed at its forward end on a horizontal axis 10 in the form of a bolt extending horizontally through the two draft-bars and through a rearwardly-extending frame 11, projecting from the plow-beam and rigidly connected thereto, as clearly shown in Figs. 1 and 2. As a result of this construction the covering-disks are movable vertically on the horizontal axis 10 with reference to the plow or frame of the machine. This vertical movement of the covering-disks is controlled by and subject to the action of a spiral spring 12, Fig. 1, which encircles a vertical rod 13, connected at its lower end with the rear end of the frame 11 and extending upward loosely through a hole in an extension 14 on the disk-frame, the lower end of the spring bearing on this extension and its upper end bearing against a head 15 in the form of a nut applied to the upper end of the rod.

As a result of the construction described the carrying-disks are urged downward with a yielding pressure, and therefore travel with a floating action, so that they will work at a uniform depth regardless of the rocking motion of the plow, which if the disk was connected rigidly with the plow would run at varying depths and fail to cover uniformly.

The adjustment of the disk-carriers on their vertical axes to vary the angles of the disks is effected simultaneously by means of an adjusting-block 16, Fig. 3, embracing and movable back and forth on a longitudinal guide-rib 17 on the under side of the casting 8. This block is provided at its ends with upwardly-projecting lugs 18, engaging loosely in sockets or holes in the inner adjacent ends of the disk-carriers, and the block is held in the position adjusted by means of a vertical clamping-bolt 19, extending upward through the block and through a longitudinal slot 20 in the rib, the upper end of the bolt having applied thereto a tightening-nut 21. By loosening this nut and moving the block backward or forward the inner ends of the disk-carriers are moved with it and simultaneously turned on their axes, thereby effecting the simultaneous and uniform adjustment of the disks.

The axial or pivotal connection of the disk-carriers with the frame 8 is formed by providing the upper side of the carrier with a conical hollow hub 23, Fig. 3, which fits into a conical socket 24 on the frame 8, the parts being held in operative relation by a bolt 25, formed with a square head seated in a corresponding opening in the hub and extending upward through the socket, where it is provided with a fastening-nut 26. In assembling the parts this bolt is inserted in the hollow hub through an open slot 27 therein. By means of this construction a firm and true bearing for the disk-carriers is formed, and by reason of the conical form of the bearing-surfaces the parts may be held firmly and rigidly in the positions adjusted by the adjusting-block.

While in the drawings my improved covering device is shown as connected with the beam of a plow which is adapted to be equipped with a seed-discharging mechanism, it will be understood that my invention is not limited in its use in this connection, but is applicable as well to other forms of seeding-machines and may be connected with the frames of such machines, so as to cover the deposited seed. The expression "plow-beam" employed in the claims is therefore intended to embrace the frames of any structure in the nature of an agricultural implement to which my invention is applicable and in connection with which its operation is substantially as set forth in the specification.

Having thus described my invention, what I claim is—

1. In combination with a plow-beam, a rigid rearward projection thereon, a vertically-movable disk-frame, covering-disks mounted thereon, a spring acting respectively against the disk-frame and rearward projection and serving to hold the disks yieldingly to their work.

2. In combination with a plow-beam, a rigid rearward projection thereon, a disk-frame having covering-disks, a draft-frame connected with the disk-frame and jointed at its forward end on a horizontal axis, a vertical rod connected at its lower end with the rearward projection and extending upward through the disk-frame, and a spring encircling the rod and bearing against the same and against the disk-frame.

3. In combination with a plow-beam, a rigid projection extending rearwardly therefrom, a disk-frame having covering-disks, a draft-frame connected to the same and jointed at its forward end to the rearward projection on a horizontal axis, a rod extending from the rearward projection upward through the disk-frame, and a spiral spring encircling the rod and bearing against the same and the disk-frame.

4. In a disk coverer the combination with a disk-frame of disk-carriers mounted thereon on vertical axes, disks mounted on the carriers, and a longitudinally-adjustable member sustained by the disk-frame and engaging the disk-carriers.

5. In a disk coverer the combination with a disk-frame, of two horizontal disk-carriers pivoted between their ends on vertical axes, disks mounted on the outer ends of said carriers, a longitudinal rib on the frame having a longitudinal slot therein, an adjusting-block embracing the rib and provided with lugs engaging the inner ends of the disk-carriers, and a clamping-bolt extending through the block and through the slot in the disk-frame.

6. In a disk coverer the combination with a disk-frame provided with vertical sockets, disk-carriers provided with hubs engaging in said sockets, and fastening-bolts extending through the parts and serving to maintain them in operative relations.

7. In a disk coverer the combination with the disk-frame having sockets in its under side, horizontal disk-carriers provided with hollow hubs on their upper sides, a bolt provided with an angular head seated in the hollow hub and extending upwardly through the same and through the sockets in the disk-frame, and a nut applied to the bolt.

8. In a disk coverer the combination with the disk-frame provided with a conical socket, a disk-carrier provided with a conical hub seated in said socket, and a clamping-bolt having a head seated in the hub and extending upwardly through the socket on the disk-frame, and a clamping-nut applied to the bolt.

In testimony whereof I hereunto set my hand, this 13th day of November, 1902, in the presence of two attesting witnesses.

ALEXUS C. LINDGREN.

Witnesses:
 CLYDE KING,
 R. A. DOUGLASS.